United States Patent
Ritter

[11] 3,834,164
[45] Sept. 10, 1974

[54] HYDROSTATIC TORQUE CONVERTER

[75] Inventor: Kaspar Ritter, Kirchheim Teck, Germany

[73] Assignee: KOPAT Gesellschaft, fur Konstruktion Entwicklung und Patent Ver wertung M.b.H. & Co., K.G., Boll, Kreis Goppingen, Germany

[22] Filed: Jan. 24, 1973

[21] Appl. No.: 326,443

[30] Foreign Application Priority Data
Jan. 26, 1972 Germany.......................... 2203478
Dec. 30, 1972 Germany.......................... 2264319

[52] U.S. Cl. .............................................. 60/492
[51] Int. Cl. .......................................... F16h 39/46
[58] Field of Search ............ 60/492, 491, 490, 488, 60/19, DIG. 5, DIG. 10

[56] References Cited
UNITED STATES PATENTS
| | | | |
|---|---|---|---|
| 3,107,490 | 10/1963 | Cooper et al. ........................ | 60/492 |
| 3,123,975 | 3/1969 | Ebert.................................... | 60/492 |
| 3,157,998 | 11/1964 | Harris................................... | 60/492 |
| 3,271,956 | 9/1966 | Lambeth............................... | 60/492 |

Primary Examiner—Edgar W. Geoghegan

[57] ABSTRACT

A hydrostatic torque converter which comprises a joint housing, an axial piston-pump to constitute a pump part and an axial piston-motor to constitute a motor part with variable feeding- and absorption-volume, respectively, within the joint housing, in particular for the use as a drive controlled in accordance with the output requirement for the drive of a generator operating with a comparatively high number of revolutions variable at a ratio of about 1:5 by means of an internal combustion engine with an essentially lower number of revolutions variable in turn at a ratio of about 1:6. The volume ratio of the pump part and the motor part of the converter amounts to about more than 1:1. The pump part and the motor part have swinging bodies rotatably mounted in the housing. A servo setting cylinder, a piston reciprocating therein, and a rod mechanism are coupled together. The swinging bodies are controlled by the servo cylinder with the piston by means of said mechanism such, that the output speed of the converter corresponds with the desired generator driving output which is maintained by variation of the feeding quantity of the axial piston-pump and for the absorption quantity of the axial piston-motor independent from the input speed of the converter.

8 Claims, 5 Drawing Figures

HYDROSTATIC TORQUE CONVERTER

The present invention relates to a hydrostatic torque converter, comprising an axial piston-pump and an axial piston-motor with directly engaging pistons and variable feeding — or absorption-volume, which are disposed with a joint drive housing. Such hydrostatic torque converters are already known in most different embodiments. The known converters possess however, generally only a torque converter range up to about 1:3 in "direct driving" and about 1:4 in divided power, that latter means with mechanical feeding through of the input torque towards the output side. Since the known torque converters are used dominantly for the amplification of the input torque with corresponding reduction of the number of revolutions, one has designed the latter also already with an enlarged absorption volume of the motor part relative to the feeding volume of the pump part.

It is one object of the present invention to provide a hydrostatic torque converter, which is determined in particular for the use as a drive for driving a generator controlled in accordance with its output requirement with a variable number of revolutions in a range of, ratios of about 1:5 by means of a vehicle-internal combustion engine with a variable number of revolutions at about the ratio of 1:6.

It is another object of the present invention to provide a hydrostatic torque converter, wherein the volume ratio of the pump part to the motor part of the converter is more than 1:1, preferably 1.5 to 2:1, and the swinging bodies of the pump part and of the motor part mounted swingably in the housing are controlled by a cylinder with piston and a rod mechanism coupled together, so that the converter output speed belonging to the desired generator driving capacity is maintained by variation of the feeding quantity of the axial piston-pump and/or absorption quantity of the axial piston motor is maintained independently from the input speed of the converter. By this design of the converter a torque converting range up to about 1:10 and a control speed range for the control of the number of revolutions even up to about 1:30 with comparatively simple constructive arrangements of the compact drive with smallest outer dimensions is obtained, which is of particular importance for the intended purpose of use as an automatically controlled drive for vehicle generators and the like.

For the formation of the coupled rod arrangement in the servo adjustment cylinder and the swinging bodies of the pump and motor parts for the control of the converter to the desired output speed, different constructive possibilities exist. Thus, by example, the two swinging bodies can be operated by separately controllable adjustment pistons. A further possibility of design resides in an arrangement according to which, in a joint adjustment cylinder with a piston there is arranged a particularly controllable control bushing between cylinder and piston. In a further development of the present invention the control of the swinging bodies is designed particularly advantageously such, that the coupling rod mechanism engages the pump swinging body with a larger lever arm than on the motor-swinging body and the rod mechanism leading to the motor-swinging body is so designed for a variable length, that its system length upon reaching of the largest swinging angle is capable of being shortened by a swinging angle limited by an abutment. This control has a particularly simple structure of comparatively few individual parts and contributes essentially thereby to the reduction of the measurements and of the production costs of the converter according to the present invention. The capability of the variation of the length of the part connecting the servo-adjustment cylinder with the swinging bodies of the axial piston-motor of the coupling rod mechanism can be designed constructively differently within the scope of the present invention for example by use of a push and pull rod formed as a telescopic tube, the parts of which being held by a pretensioned pressure spring disposed therebetween in their completely run out position limited by an abutment until the preloading of the spring is overcome.

A further advantageous feature of the converter in accordance with the present invention resides in the fact that with "back-to-back" arrangement of the pump-part and motor-part of the converter the servo-adjustment cylinder and preferably also the control slide are disposed substantially in the plane of a joint control disc for both converter parts. By this arrangement of the converter and of the servo control there results a particularly small converter diameter; in addition the two swinging bodies of the pump-part and motor-part can be operated with a minimum number of simple individual parts in the required dependency from each other. A somewhat varied embodiment of the torque converter designed in accordance with the present invention resides in an arrangement according to which the pump- and motor-part are disposed on the same side of the control disc closing the joint housing on one side. By such arrangement on top of each other or adjacent each other, respectively of the pump- and motor-part, there has been achieved reduction of the structural length of the hydrostatic torque converter to about two-thirds of the structural length required in case of operative arrangement on both sides of a joint control disc. The simultaneous enlargement of the total height or width, respectively of the torque converter is less disturbing for the provision of the converter itself and of the generator driven by the latter, since in the heights direction and width direction of the vehicle motor room generally more structure space is available than in the longitudinal direction of the vehicle.

A further advantageous development of the hydrostatic converter with a pump-part and motor-part disposed on top of each other or next to each other, respectively, resides in the fact, that the housing is provided with connections or terminals for a generator preferably likewise in a vertical plane with the pump-part and motor-part parallel to the latter, which generator is connected by means of a pulling means drive (preferably tooth belt drive in a speeding up ratio) with the output shaft of the converter motor part. By this arrangement the structural length for the hydrostatic converter can be limited including the electric generator driven by the latter to the converter length and simultaneously the generator can be drive with a comparatively high maximal number of revolutions up to by example 12,000 revolutions/min from the converter motor part rotating with a maximum output number of revolutions of about 5,000 revolutions/min.

It is still another object of the present invention to equip the hydrostatic torque converter with two filling pumps, one of which is driven by the input shaft and the other by the output shaft. By this arrangement, the possibility is created, of using the hydrostatic torque converter also for starting the internal combustion engine, serving normally as prime mover for the vehicle, by means of the generator switchable to working as a motor driven by electrical energy of the vehicle battery, whereby a separate starter can be omitted. This additional exploitation of the hydrostatic torque converter of the present invention has the great advantage over the known combined starter-light machines, that for the starting acceleration of the internal combustion engine by the high speed reduction a sufficient torque is available, without charging the battery with high top currents, which affect very badly the lifetime of the battery.

In accordance with another advantageous further development of the torque converter in accordance with the present invention, in its output shaft an outlet valve for the filling liquid controlled by a centrifugal force can be provided. By such simple valve, the converter can be protected also in case of a possible failing of the servo-control for any reason the safety against the occurrence of a non-permissible high starting number of revolutions. Upon lowering the filling pressure below the opening pressure of the pressure holding valve, no filling oil is fed any more into the suction side of the converter, so that the pistons used under pressure during the operation, by means of the filling pressure against the pressure bearings, lift from the latter and remain in their position rolling into the bores of the cylinder drums, so that the power flow is interrupted through the converter.

Finally it is within the scope of the present invention that in the bottom part of the housing, which is formed as oil containers, channels are provided for passing through a cooling liquid. Such liquid cooling for the working fluid of the converter constitutes an advantageous solution just by the provided main purpose for using the drive as driving means for the current generator in a motor vehicle, for a safe feeding off of the heat created by the converter losses in all operational states with a comparatively low structural requirement.

With these and other objects in view, which will become apparent in the following detailed description, the present invention, which is shown by example only, will be clearly understood in connection with the accompanying drawings, in which.

Figure 1:
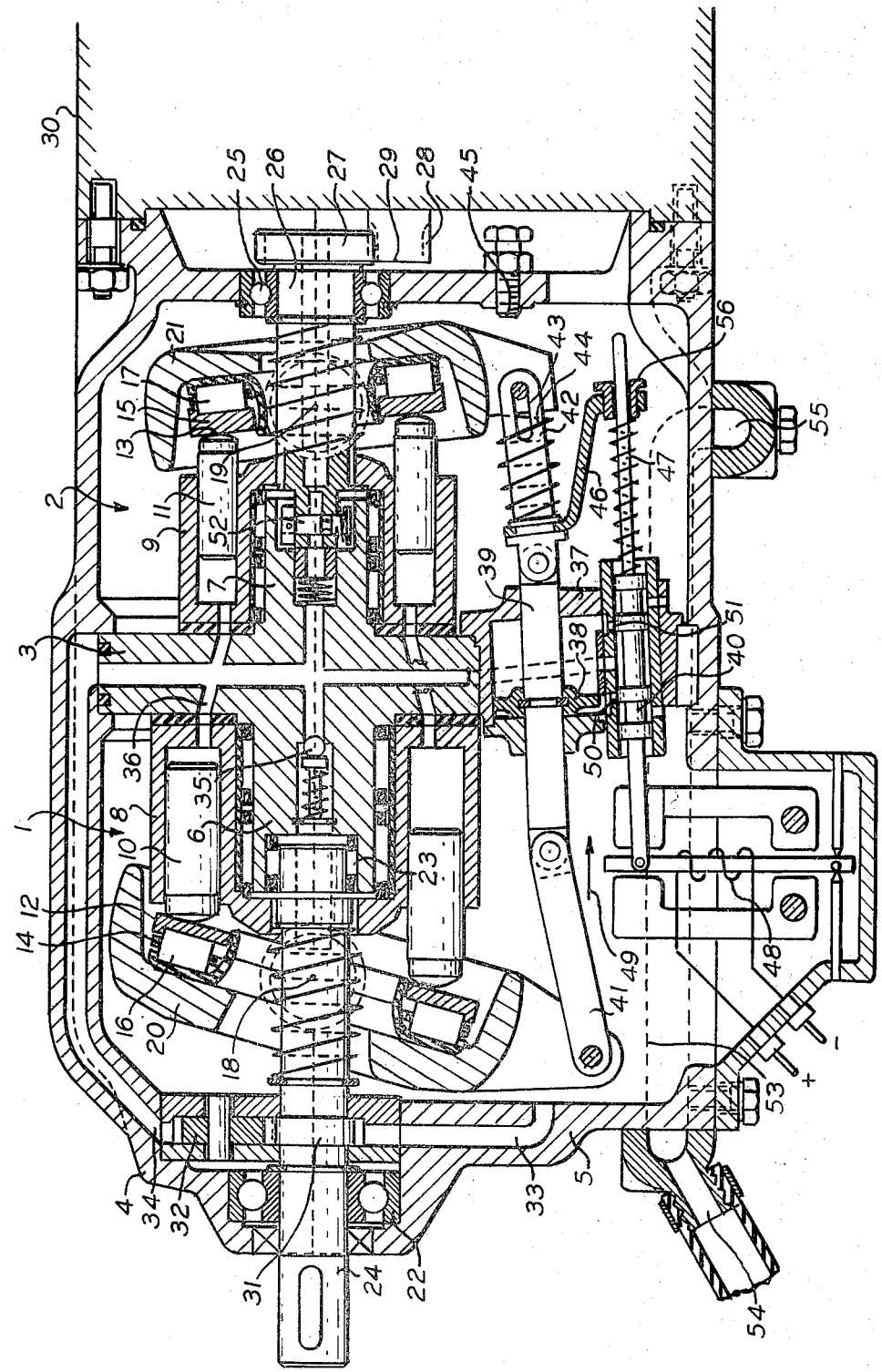
FIG. 1 is a longitudinal section through a first embodiment of a hydrostatic torque converter designed in accordance with the present invention.

Referring now to the drawings, and in particular to FIG. 1, which discloses a vertical longitudinal section by a first example of the hydrostatic torque converter, in accordance with the present invention, which comprises an axial piston-pump 1 and an axial piston-motor 2, which are disposed in a so-called "back-to-back" arrangement on both sides of a control disc 3 and which are surrounded by a joint housing 4 and 5 divided in the horizontal plane through the longitudinal axis of the converter. The axial piston-pump 1 and the axial piston-motor 2 comprise cylinder drums 8 and 9 mounted on pins 6 and 7, respectively, of the control disc 3, with piston sets 10 and 11, respectively, guided movably therein, the heads 12 and 13, respectively, of which engage directly on the jointly moving rings 14 or 15, respectively, of the pressure bearings 16 and 17, respectively arranged in, swinging bodies 20 or 21 swingably mounted with axles 18 and 19, respectively, in the housing 4 and 5. The cylinder drum 8 of the axial piston-pump 1 is connected for joint rotation with the input shaft 24 rotatably supported in bearings 22 and 23, whereas the cylinder drum 9 of the axial piston-motor 2 is connected non-rotably with the output shaft 26 supported in the bearing 25 and in the cylinder drum 9. The output shaft 26 carries at its end projecting from the housing 4 and 5 a toothed gear 27, which forms with a corresponding pinion 28 of the shaft 29 of the flanged generator unit 30 a transmission in the embodiment shown by example with a transmission ratio about 2:1 into greater speed. The largest feeding volume of the axial-piston pump 1 stands to the greatest absorption volume of the axial-motor 2 (with greatest angular extensions of the swinging bodies 20 and 21), in the converter of the present invention at a ratio of about 2:1, which results in a basic transmission ratio of likewise 2:1 into greater speed. The swinging body 20 of the axial piston-pump 1 is in the drawing shown in its fully extended position of about 15° and the swinging body 21 of the axial piston-motor 2 in its position with the smallest angular extension of about 4°, which corresponds with the largest transmission ratio of about 7.5 : 1 into a greater speed. By reduction of the angular amplitude of the pump swinging body 20 to a minimum value of about 3° and enlarging the angular amplitude of the motor swinging body 21 to its greatest value of about 15°, the transmission ratio can be varied up to 1.4 into slow speed, which corresponds with a total range of ratios within the torque converter of about 1 : 30.

The torque converter housing 4 and 5 serves simultaneously as storage container for the working fluid, which in the embodiment shown by example in FIG. 1 is sucked up by a gear pump 31 and 32 mounted on the input shaft 24 continuously sending oil through a channel 33 and presses it through a channel 34 leading to the control disc 3 with a filling pressure determined by a safety valve 35 into the suction side of the converter for equalization for the working fluid escaping at the control faces and the cylinder bores from the inner high pressure liquid circuit. The liquid fed through the gear pump 31 and 32 continuously at the filling pressure into the control disc is used, in addition to filling of the inner converter circuit between the cylinder drums 8 and 9, simultaneously as pressure means for operation of the servo adjustment device for the swinging bodies 20 and 21 of the converter which servo adjustment device comprises a cylinder 37 with piston 38 and piston rod 39 and a control slide 40. For depicting the converter characteristic, shown schematically in FIG. 2, the piston rod 39 of the adjustment piston 38 is so connected with the swinging body 20 of the axial-piston pump 1 by means of a connection rod 41 non-variable as to its length and pivotally connected with the swivel body 20 of the axial piston-pump 1, that the rod arrangement operates with a substantially larger lever arm on the swivel body than the corresponding rod arrangement 42 for the swinging body 21 of the axial-piston motor 2. The rod arrangement 42 is in addition at one end provided with a long slot or hole 43 and a pretensioned pressure spring 44 connecting the rod arrangement 42 with the swinging body 21 so that the piston 38 with the piston rod 39 can move further to the right with a further setting of the swinging body 20 of the axial piston-pump 1, after the swinging body 21 of the axial piston motor 2 already has obtained the largest angular amplitude limited by means of a settable abutment 45.

The control slide 40 equipped with a mechanical spring return 46, 47, is operated by means of an electro-magnetic impulse generator 48-shown schematically only and is by any control circuit influencing the voltage and thereby the adjustment force of the impulse generator 48 eventually automatically, e.g., by a thermostat of an eliminating device - so set, that the ratio within the converter at each output speed variable in a speed range of 1:5 is automatically so controlled that the output speed remains constant independently from the output speed variable in a speed range of 1:6.

The end position of the swinging bodies and the control piston 38 in the cylinder 37 shown in FIG. 1 correspond with the largest transmission ratio of about 7.5 : 1 in the fast speed upon engagement of the highest provided control voltage to the impulse generator 48. This position corresponds with the greatest value of the magnetic force effected in the direction of the arrow 49 on the control slide 40, which force is in equilibrium with the likewise largest force of the completely compressed return spring 44, which force is adjusted by means of a screw 56. With each reduction of the magnetic force effective in the direction of the arrow 49, for example for setting to a lower output speed of the converter, the pretension spring 47 displaces the control slide 40 towards the left, so that the opening 50 is freed on the left side of the piston 38 in the servo cylinder 37 for the pressure fluid. By this arrangement the converter is displaced so long in the direction to a smaller transmission ratio, until the pretension force of the spring 47 reducing thereby strains in the equilibrium with the magnetic force and the control slide 40 returns to the center position locking both of the access openings 50 and 51 to the setting cylinder 37. By combining the largest control voltage to the largest transmission ratio of the converter into fast speed, it is brought about that the converter upon omission of the control voltage always automatically is adjusted automatically into the position with the lowest output speed. As additional safety of the converter against overstepping of the highest permissible output speed upon occurrence of any mechanical disturbances in the electrohydraulic servo setting device by, for example, clamping of the control disc or of the setting piston in the output shaft 26 an outlet valve 52 is arranged, which is operable by centrifugal force, by the opening of which the pressure in the filling oil circuit is reduced immediately and accordingly the power transfer onto the axial piston-motor 1 is interrupted due to lifting of the pistons from their engaging face.

In order to make possible to feed off safely in the operation of the converter the heat transferring by the loss output to the working fluid also by working with full power, a plurality of channels 53 are provided in the bottom part of the housing 5, through which a liquid cooling fluid is led entering at a connection 54 and emerging at a corresponding connection, turned round at 55. In case of use of the torque converter in an automotive vehicle, such liquid cooling can be performed in a particularly simple manner by connection to the cooling circuit of the vehicle driving motor.

Figure 2:
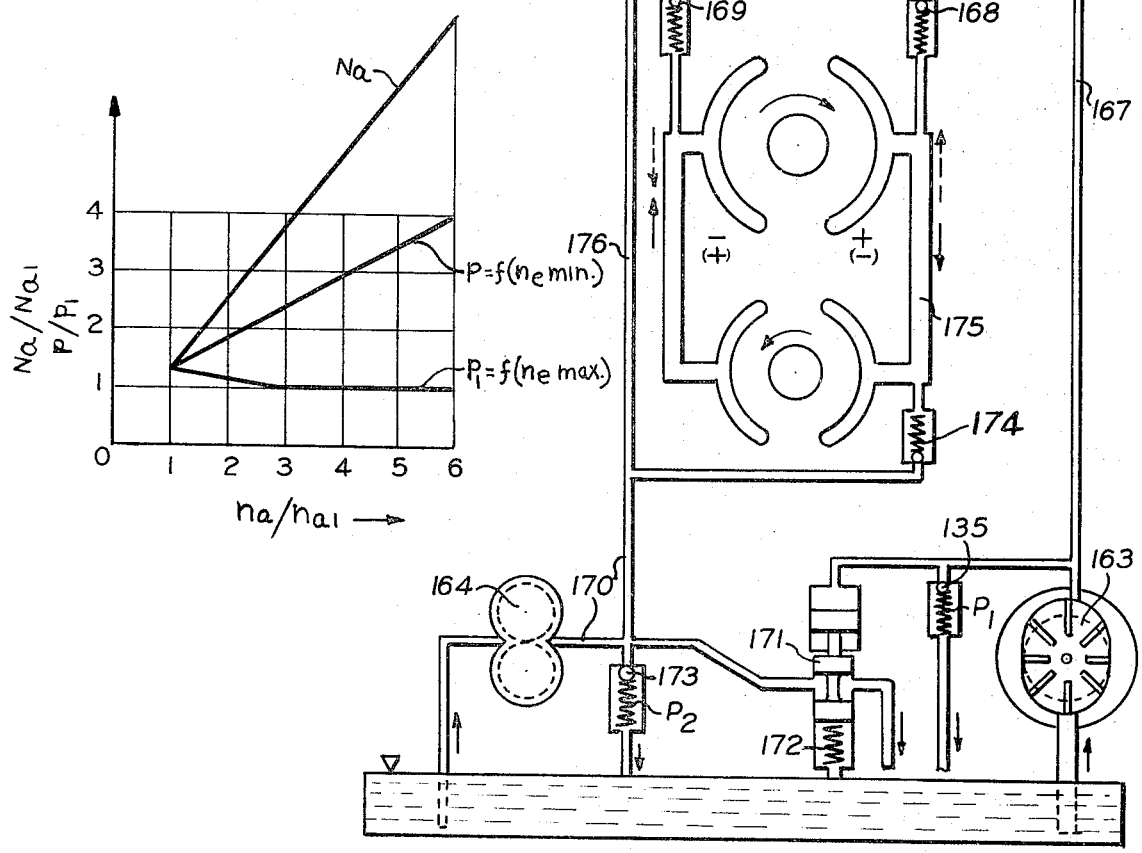
FIG. 2 depicts diagrammatically the converter characteristics.

In the showing of the converter-characteristic in form of a schematic diagram in FIG. 2, the output speed $n_a$ /$na_1$ is depicted as abscissa and the non-dimensional pressure $p/p_1$- as ordinate; the working pressure graphs $p=f(n_{emin})$ and $p_1=f(n_{e\ max})$ correspond to the lowest and highest input speeds of the converter and $N_a$ shows the available output.

Figure 3:
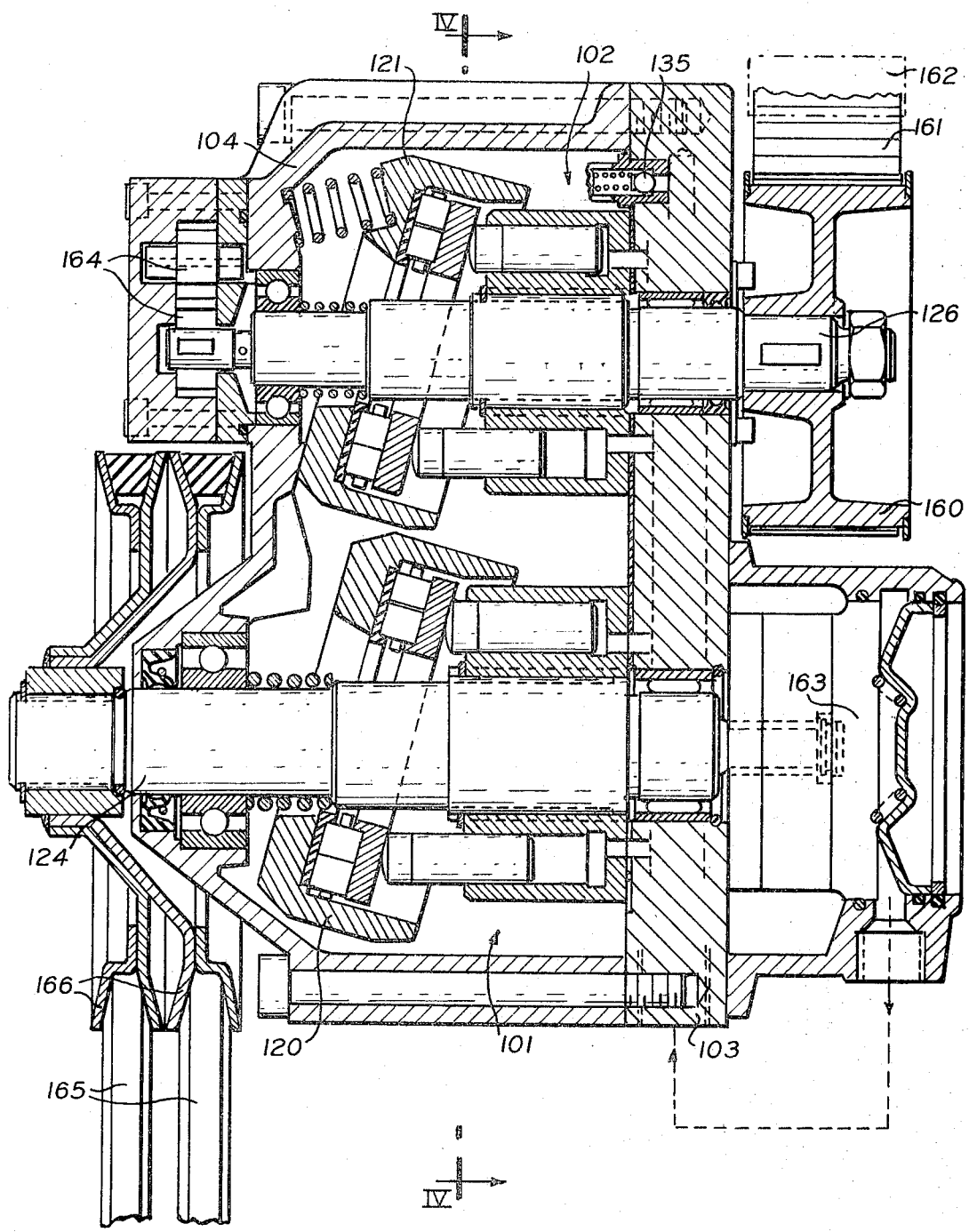
FIG. 3 is a longitudinal section through a second embodiment of a hydrostatic torque converter in accordance with the present invention.
Figure 4:
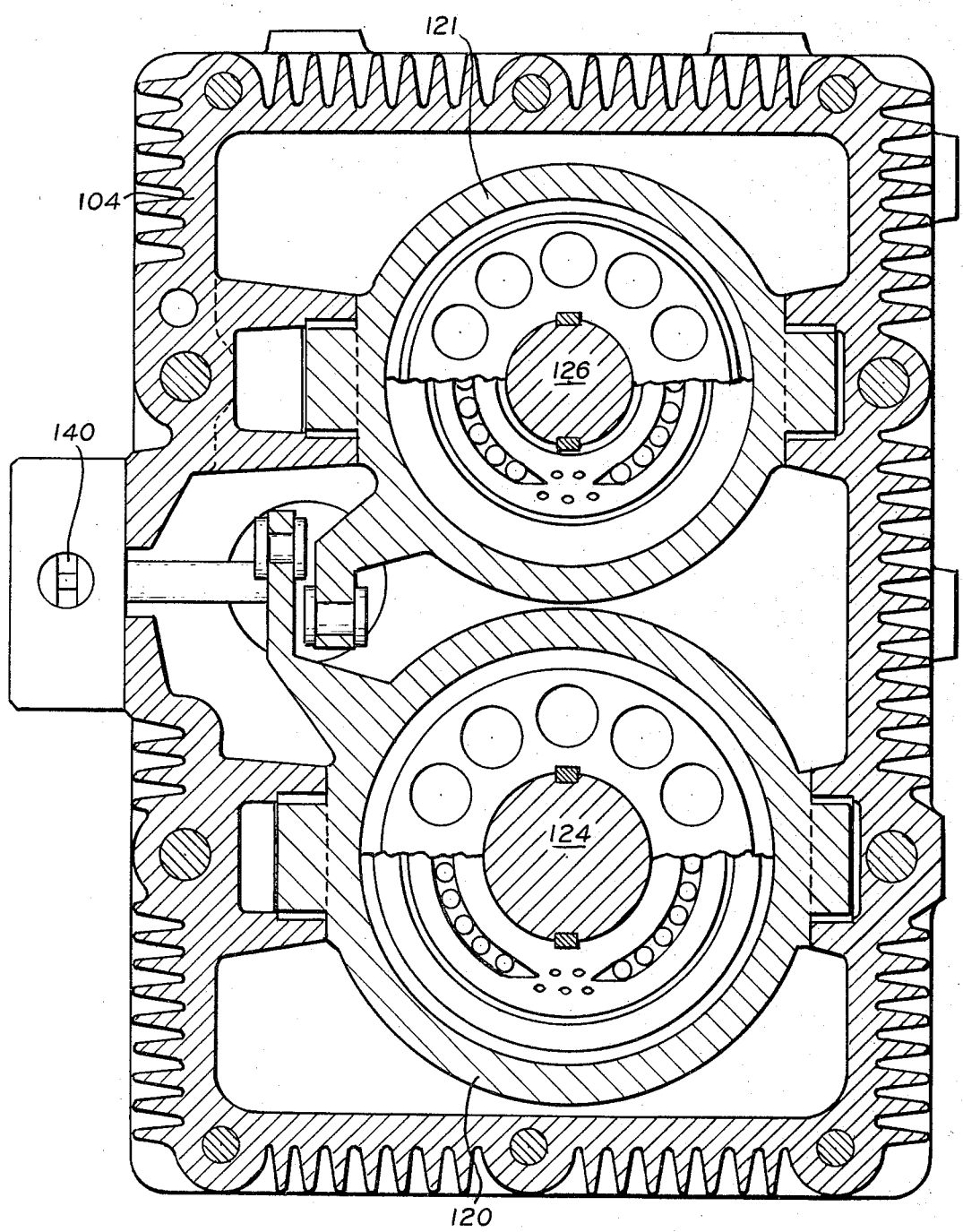
FIG. 4 is a section along the lines IV—IV in FIG. 3.

By the use of corresponding numerals, increased by 100, for the structural parts corresponding with the hydrostatic torque converter described above for example, in the further example disclosed in FIGS. 3 and 4, the pump part 101 and the motor part 102 on the same side of the control disc 103 are disposed with a driving shaft 124 and an output shaft 126 arranged parallel to each other in the joint housing 104. The greatest feeding volume of the pump part 101 has a ratio with the greatest absorption volume of the motor part 102 of about 1.5 : 1. The effective feeding quantity of the pump part 101 and of the absorption quantity of the motor part 102 can be adjusted correspondingly relative to each other by means of a servosetting with an automatic control device by setting of the swinging bodies 120 and 121, respectively to different oblique angles in the housing 104. The control range of the converter is arranged such, that, on the one hand, with the lowest (idle) input speed of the pump drive shaft 124 of $n_E$ about rpm the motor-output shaft 126 can be driven with highest output speed of about 5,000 rpm by which the (not shown) electric generator corresponding is driven with maximum speed and full power by means of a toothed belt drive 160, 161 and 162 with a set transmission ratio of about 2.4: 1 into fast speed, while in the other limit case at a highest input speed $n_E$ = about 4,800 R/min, the output speed can be adjusted downwardly to $n_A$ = about 1,000 R/min. From this requirement results a total control range of about 5.57 : 1 to 1 : 4.8 of about 27.

Figure 5:
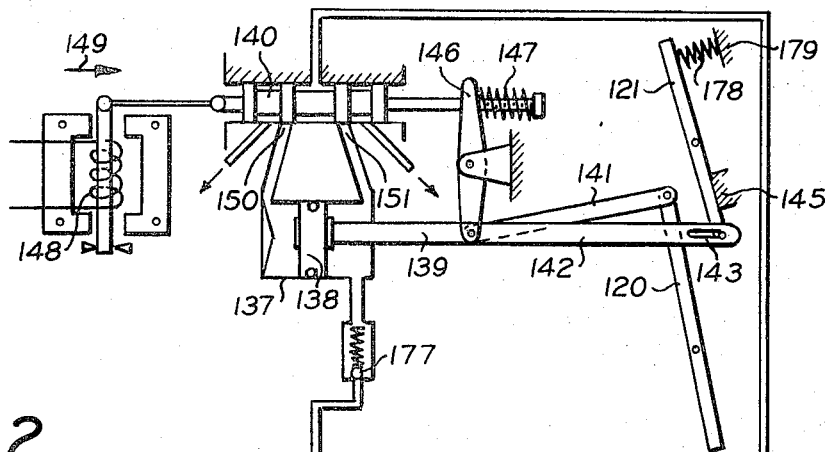
FIG. 5 is a schematic view showing the hydraulic means of the converter with auxiliary devices.

As shown in FIG. 3 and indicated in the hydraulic-scheme of FIG. 5, the hydrostatic converter of this embodiment, shown by example, is equipped with two filling pumps 163 and 164. Of the latter, the filling pump 163 connected for joint rotation with the input shaft 124 is formed as conventional capsule pump, which advantageously can be used simultaneously for the operation of a servo-steering (not shown). This pump connected with the input shaft 124 and driven by example through a double V-belt drive 165 and 166 from the vehicle engine (not shown) supplies through a pressure conduit 167 and check valves 168 and 169 a filling pressure $P_1$ of by example 7 atm. above atmospheric pressure determined by a pressure keeping valve 135 with filling oil and simultaneously the servo-setting device 137 to 151 for the swinging bodies of the converter with the required pressure fluid.

The operation of the servo setting device is known those skilled in the art in connection with the operational state given by example. In order to be able to use the converter by exchange of the pump-part and the motor-part for starting the vehicle internal combustion engine by the generator operating in this case as an electromotor, the converter is equipped with a second filling pump, by example formed as a gear pump 164 and connected for joint rotation with the output shaft 126. This gear pump 164 runs during normal operation of the converter, i.e., with driven driving shaft 124 and filling pump 163 idling, as long as a shut-off valve 171 connected with the pressure conduit 170 is retained in the open position shown in FIG. 5 by the filling pressure produced in the conduit 167 by the pump 163 against the force of a spring 172. If the filling pump 163 is however not in operation, the vehicle internal combustion engine standing still, and accordingly the conduit 167 being without pressure, the shutoff valve 171 is switched automatically into closing position by the pretensioned spring 172. As soon as the filling pump 164 connected with the converter output shaft 124 is rotated by the generator operating now as a starting motor, a filling pressure $P_2$ of by example 10.5 atm. above atmospheric pressure determined by a pressure keeping valve 173 is built up in the conduit 170. Under this pressure, the converter is charged again with the required filling oil by means of a special check valve 174, operating in this case with exchanged suction and pressure sides in the inner circuit 175 between the converter parts. Simultaneously the servo setting cylinder 137 with piston 138 and piston rod 139 is subjected to pressure by the pump 164 over a conduit 176 and a check valve 177 such, that the swinging body 121 by the rod mechanism 142 is adjusted against the force of a pretensioned spring 178 against an abutment 179 for a smallest feeding volume and the swinging body 120 is adjusted to a largest amplitude corresponding with the full absorption volume, in order to transfer a largest possible torque by the pump part 101 of the converter, which part operates in this case as a motor for starting the vehicle internal combustion engine by means of the belt drive 165. As soon as the shaft 124 of the pump part 101 during starting of the internal combustion engine starts running, the filling pump 163 connected with the latter for joint rotation starts feeding and restores after building up the full filling pressure $P_1$ in the conduit 167 the above described normal (control) operation of the converter by opening of the shut-off valve 171 automatically.

While I have disclosed several embodiments of the present invention, it is to be understood that these embodiments are given by example only and not in a limiting sense.

I claim:

1. A hydrostatic torque converter comprising a joint housing,
   an axial piston-pump constituting a pump part and
   an axial piston-motor constituting a motor part with variable feeding and absorption-volume, respectively, within said joint housing, in particular for the use as a drive controlled in accordance with the output requirement for the drive of a generator operating with a comparatively high number of revolutions variable within a range of under substantially 12,000 rpm by means of an internal combustion engine with an essentially lower number of revolutions than that of said generator and variable in turn under substantially 5,000 rpm,
   the volume ratio of said pump part and said motor part of said converter amounting to between 1.5:1 and 2:1, said pump part and said motor part having swinging bodies rotatably mounted in said housing,
   a servo setting cylinder, a piston reciprocating therein, and a rod mechanism, coupled together,
   said swinging bodies being controlled by said servo cylinder with said piston by means of said rod mechanism such, that the output speed of said converter corresponds with the desired generator driving speed maintained by variation of the feeding quantity of said axial piston-pump and for the absorption quantity of said axial piston-motor independent of the input speed of said converter.

2. The hydrostatic torque converter, as set forth in claim 1, wherein
   said rod mechanism engages said swinging body of said axial piston pump with a larger lever arm than said swinging body of said axial piston motor, and said rod mechanism leading to the latter is variable relative to its length such, that its system length is capable of being shortened automatically, upon reaching the largest swinging angle limited by abutment means.

3. The hydrostatic torque converter, as set forth in claim 1, wherein
   said pump part and said motor part are designed in "back-to-back" arrangement,
   a control slide,
   a joint control disc for both of said parts, and
   said servo setting cylinder and said control slide are disposed substantially in the plane of said control disc.

4. The hydrostatic torque converter, as set forth in claim 1, wherein
   said control disc closes said joint housing on one side, and
   said pump part and said motor part are disposed on the same side of said control disc.

5. The hydrostatic torque converter, as set forth in claim 4, which includes
   a generator having connecting means on said housing and being disposed in the plane of and parallel to said pump part and said motor part, and
   said generator is connected with said output shaft of said motor part by means of a traction drive transmitted into high speed.

6. The hydrostatic torque converter, as set forth in claim 1, which includes
   two filling pumps,
   one of said filling pumps is driven by said input shaft, and
   the other of said filling pumps is driven by said output shaft.

7. The hydrostatic torque converter, as set forth in claim 1, which includes
   a discharge valve controlled by a centrifugal force and disposed in said output shaft for the filling liquid for an automatic limitation of the maximum number of revolutions.

8. The hydrostatic torque converter, as set forth in claim 1, wherein
   the bottom part of said housing constitutes an oil container, and includes a plurality of channels for feeding a cooling liquid therethrough.

* * * * *